United States Patent [19]

Nelson et al.

[11] Patent Number: 5,510,626
[45] Date of Patent: Apr. 23, 1996

[54] SYSTEM AND METHOD FOR CONDITIONING A RADIATION DETECTOR

[75] Inventors: Owen L. Nelson, St. Paul; Jathan D. Edwards, Afton; Earl L. Cook, Woodbury; Padmanabham A. Arimilli, Vadnais Heights, all of Minn.

[73] Assignee: Minnesota Mining and Manufacturing Company, St. Paul, Minn.

[21] Appl. No.: 263,800

[22] Filed: Jun. 22, 1994

[51] Int. Cl.$^6$ .................................. G01N 23/04
[52] U.S. Cl. ............................. 250/591; 250/580
[58] Field of Search ............................ 250/591, 580

[56] References Cited

U.S. PATENT DOCUMENTS

| | | | |
|---|---|---|---|
| 4,176,275 | 11/1979 | Korn et al. | 250/213 R |
| 4,521,808 | 6/1985 | Ong et al. | 358/111 |
| 4,804,602 | 2/1989 | Buettner et al. | 430/42 |
| 4,818,857 | 4/1989 | Micheron et al. | 250/213 R |
| 5,013,916 | 5/1991 | Umemoto et al. | 250/484.4 |
| 5,059,794 | 10/1991 | Takahashi et al. | |
| 5,083,163 | 1/1992 | Brown et al. | 355/219 |
| 5,198,673 | 3/1993 | Rougeot et al. | 250/370.11 |
| 5,268,569 | 12/1993 | Nelson et al. | 250/591 |

OTHER PUBLICATIONS

*Electrophotography*, R. M. Schaffert, M. A., Ph.D., 1975, pp. 166–167, The Focal Press, London & New York.
O. L. Nelson and D. M. Korn, *Photographic Science and Engineering*, vol. 22, No. 4, Jul./Aug. 1978, pp. 189–193.
D. M. Korn, S. P. Johnson, O. L. Nelson and R. J. Ziegler, *Journal of Applied Photographic Engineering*, vol. 4, No. 4, Fall 1978, pp. 178–182, "A Method of Electronic Readout of Electrophotographic and Electroradiographic Images".
JP 63-34797, *Patent Abstracts of Japan*, vol. 12, No. 243, Jul. 9, 1988, p. 115–p. 728.

*Primary Examiner*—Carolyn E. Fields
*Attorney, Agent, or Firm*—Gary L. Griswold; Walter N. Kirn; Steven J. Shumaker

[57] ABSTRACT

A system and method for conditioning a photoconductive radiation detector achieve charge redistribution within a photoconductive layer without the need for charge removal or charge injection techniques. A first conditioning voltage is applied across the detector to establish a first electric field. The first electric field is reversed relative to fields applied to the detector during image exposure and image read-out operations. While the first conditioning voltage is maintained, the photoconductive layer is exposed for a period of time to first conditioning radiation having one or more wavelengths selected to penetrate at least a portion of the photoconductive layer. A second conditioning voltage, less than the first conditioning voltage, then can be optionally applied across the detector to establish a forward bias electric field. While the second conditioning voltage is maintained, the photoconductive layer is exposed for a period of time to second, broad spectrum conditioning radiation. The detector can then be placed in a dark environment for a period of time, in a shorted condition, to dark-adapt the photoconductive layer.

52 Claims, 6 Drawing Sheets

SYSTEM AND METHOD FOR CONDITIONING A RADIATION DETECTOR

FIELD OF THE INVENTION

The present invention relates to imaging, and, more particularly, to techniques for conditioning photoconductive detectors useful in radiography.

DISCUSSION OF RELATED ART

Conventional X-ray imaging systems employ an X-ray sensitive fluorescent screen and a photosensitive film to form a visible analog representation of a modulated X-ray pattern. The fluorescent screen absorbs X-ray radiation, and is thereby stimulated to emit visible light. The visible light exposes the photosensitive film to form a latent image of the X-ray pattern. The film is then chemically processed to transform the latent image into a visible analog representation of the X-ray pattern.

More recently, efforts have been made to develop systems for acquiring digital X-ray images using various physical processes. Several approaches have focused on the use of radiation detectors made with photoconductive materials such as amorphous selenium. One type of photoconductive radiation detector includes a multilayer structure having a first conductive layer, a photoconductive layer disposed adjacent the first conductive layer, an insulative layer disposed adjacent the photoconductive layer opposite the first conductive layer, and a second conductive layer disposed adjacent the insulative layer opposite the photoconductive layer. The adjacent surfaces of the photoconductive layer and the insulative layer define a photoconductor-insulator interface. A junction layer is formed between the adjacent surfaces of the photoconductive layer and the first conductive layer.

For a radiation detector as described above, an imaging operation is accomplished by applying a first voltage across the first and second conductive layers, and exposing the photoconductive layer to imaging radiation. With a photoconductive layer of amorphous selenium, for example, the first voltage may have a positive polarity at the second conductive layer and a negative polarity at the first conductive layer. The application of the first voltage creates a first electric field across the detector. The absorption of imaging radiation by the photoconductive detector creates electron-hole pairs in the photoconductive layer. The first electric field separates the electron-hole pairs to form a set of charge carriers that create an electrostatic latent image at the interface between the photoconductive layer and the insulative layer.

The latent image can be read out and digitized to realize a digital representation of the radiation pattern. The read-out operation is accomplished by applying a second voltage across the first and second conductive layers, thereby creating a second electric field. A pixel-sized beam of readout radiation is then raster scanned across the photoconductive detector. The scanned beam substantially completes the local discharge of the photoconductive layer at each pixel point, causing movement of a second set of charge carriers in the applied electric field. The imaged areas of the photoconductive detector, which form the latent image, respond to the beam by producing less charge movement than non-imaged areas. Consequently, the level of detected current varies as an image-wise function of the position of the scanned beam on the photoconductive layer. A current detection circuit senses local current between the first and second conductive layers as each pixel point is scanned. The current detection circuit processes the current level detected at each pixel point to generate a representation of the latent image, which may take the form of a digital representation.

A radiation detector as described above can be reused for subsequent imaging operations, but only after conditioning to redistribute latent image charge and read-out charge collected at the photoconductor-insulator interface. The conditioning operation effectively erases the photoconductive detector for the next imaging operation. To properly condition a photoconductive detector, charge collected at the photoconductor-insulator interface should be either neutralized or removed. Unlike single-layer photoconductive structures, such as those used in xerography, the closed structure of the photoconductive detector does not allow the application of external charge to neutralize the collected charge. Specifically, the insulative layer of the detector covers the photoconductive layer, making the photoconductor-insulator interface inaccessible to external charge.

The inability to apply external charge to the interface has led to the study of charge removal as an alternative conditioning technique. Charge removal involves transport of the collected charge from the photoconductor-insulator interface, through the photoconductive layer, and to the junction layer. Transport can be accomplished to some extent by shorting the first and second conductive layers, and darkadapting the shorted photoconductive detector, i.e., placing the detector in a dark environment for a period of time. A flood light exposure optionally can be performed prior to dark-adapting the detector. The shorting of the conductive layers creates an electric field that facilitates charge movement across the photoconductive layer to the first conductive layer. The electric field would effectively remove the charge from the photoconductor-insulator interface if the charge were free to transport. The charge typically is not all free, however, but held in interface trap sites. Because the trap sites prevent transport, charge removal generally has not been considered a completely effective technique for conditioning a photoconductor detector.

Other conditioning techniques have focused on charge injection as a means to neutralize the collected charge, due to the deficiencies encountered with the charge removal technique. Charge injection involves the transport of neutralizing charge from the first conductive layer to the photoconductor-insulator interface. Conditioning by charge injection has proved effective. Unfortunately, the physical requirements of charge injection have placed undesirable constraints on the structure of the overall photoconductive detector. In particular, the charge injection technique complicates fabrication of the junction layer separating the first conductive layer and the photoconductive layer. The imaging and read-out operations involve the application of a high potential across the first and second conductive layers. To avoid premature discharge, the junction layer should be constructed to electrically block charge flow from the photoconductive layer to the first conductive layer. For charge injection, however, the junction layer also should be constructed to allow charge flow from the first conductive layer to the photoconductive layer.

The charge injection conditioning technique therefore generally requires the formation of a "rectifying" junction layer between the first conductive layer and the photoconductive layer. A "rectifying" junction layer substantially blocks charge flow in one direction only, generally allowing charge flow in the opposite direction. The formation of a "rectifying" junction layer involves a complicated process having an uncertain success rate. Specifically, the "rectifying" junction layer generally is formed by creating a carefully controlled oxide layer on an aluminum surface of the first conductive layer, and then carefully controlling the initial phases of deposition of the photoconductive layer over the oxide layer. The process for creating an oxide layer having suitable rectifying characteristics has not been fully understood by those skilled in the art, resulting in an inconsistent success rate that produces undesirably low manufacturing yields. In addition, the need for an aluminum surface constrains the choice of materials that can be used for the first conductive layer. Finally, the process for forming the oxide layer also places constraints on deposition process parameters for the photoconductive layer.

In summary, conditioning a photoconductive detector by the application of external charge has not been considered feasible due to the disposition of the insulative layer adjacent the photoconductive layer. Conditioning by charge removal has been found to be ineffective due to retention of charge carriers in interface trap sites. Finally, conditioning by charge injection provides effective charge redistribution, but has been found to require the use of a "rectifying" junction layer formed by a complicated manufacturing process.

SUMMARY OF THE INVENTION

In view of the foregoing disadvantages associated with existing techniques for conditioning a radiation detector for reuse, the present invention is directed to a conditioning system and method that achieve effective conditioning without the need for charge injection or charge removal techniques. The conditioning system and method of the present invention are not only applicable to a detector structure having a "rectifying" junction layer, but also enable the use of a fully closed detector structure having both an insulative layer and a "blocking" junction layer that substantially blocks charge flow between the photoconductive layer and the first conductive layer in both a forward bias direction and a reverse bias direction. A fully closed detector structure would be advantageous because the "blocking" junction layer could be formed by a thin insulative layer. In contrast to the complicated manufacturing processes generally necessary to form a "rectifying" junction layer, a thin insulative layer can be formed by relatively simple processes such as vacuum deposition, growth by oxidation, or solution coating to form a thin film.

Additional features and advantages of the invention will be set forth in part in the description that follows, and in part will be apparent from the description, or may be learned by practice of the invention. The advantages of the invention will be realized and attained by the system and method particularly pointed out in the written description and claims hereof, as well as in the appended drawings.

To achieve the foregoing advantages, as broadly embodied and described herein, the present invention provides a method for conditioning a radiation detector having a first conductive layer, a photoconductive layer disposed adjacent the first conductive layer, an insulative layer disposed adjacent the photoconductive layer opposite the first conductive layer, and a second conductive layer disposed adjacent the insulative layer opposite the photoconductive layer, the radiation detector forming a latent image in response to both application of an image exposure voltage across the first conductive layer and the second conductive layer and exposure to imaging radiation, and the latent image being read out during application of an image readout voltage across the first conductive layer and the second conductive layer and exposure of the detector to readout radiation, the conditioning method comprising the steps of applying a conditioning voltage across the first conductive layer and the second conductive layer, the conditioning voltage having a polarity opposite to a polarity of both the image exposure voltage and the image readout voltage, wherein the conditioning voltage establishes an electric field across the photoconductive layer and exposing the photoconductive layer to conditioning radiation having one or more wavelengths selected to penetrate at least a portion of the photoconductive layer, thereby releasing charge carriers trapped within the photoconductive layer to transport within the electric field.

The present invention also provides a system for conditioning a radiation detector having a first conductive layer, a photoconductive layer disposed adjacent the first conductive layer, an insulative layer disposed adjacent the photoconductive layer opposite the first conductive layer, and a second conductive layer disposed adjacent the insulative layer opposite the photoconductive layer, the radiation detector forming a latent image in response to both application of an image exposure voltage across the first conductive layer and the second conductive layer and exposure to imaging radiation, and the latent image being read out during application of an image readout voltage across the first conductive layer and the second conductive layer and exposure of the detector to readout radiation, the conditioning system comprising means for applying a conditioning voltage across the first conductive layer and the second conductive layer, the conditioning voltage having a polarity opposite to a polarity of both the image exposure voltage and the image readout voltage, wherein the conditioning voltage establishes an electric field across the photoconductive layer, and means for exposing the photoconductive layer to conditioning radiation having one or more wavelengths selected to penetrate at least a portion of the photoconductive layer, thereby releasing charge carriers trapped within the photoconductive layer to transport within the electric field.

It is to be understood that both the foregoing general description and the following detailed description are exemplary and explanatory only, and not restrictive of the invention, as claimed.

BRIEF DESCRIPTION OF THE DRAWINGS

The accompanying drawings are included to provide a understanding of the invention and are incorporated in and constitute a part of this specification. The drawings illustrate exemplary embodiments of the invention and together with the description serve to explain the principles of the invention.

DETAILED DESCRIPTION OF THE PREFERRED EMBODIMENT

Figure 1:
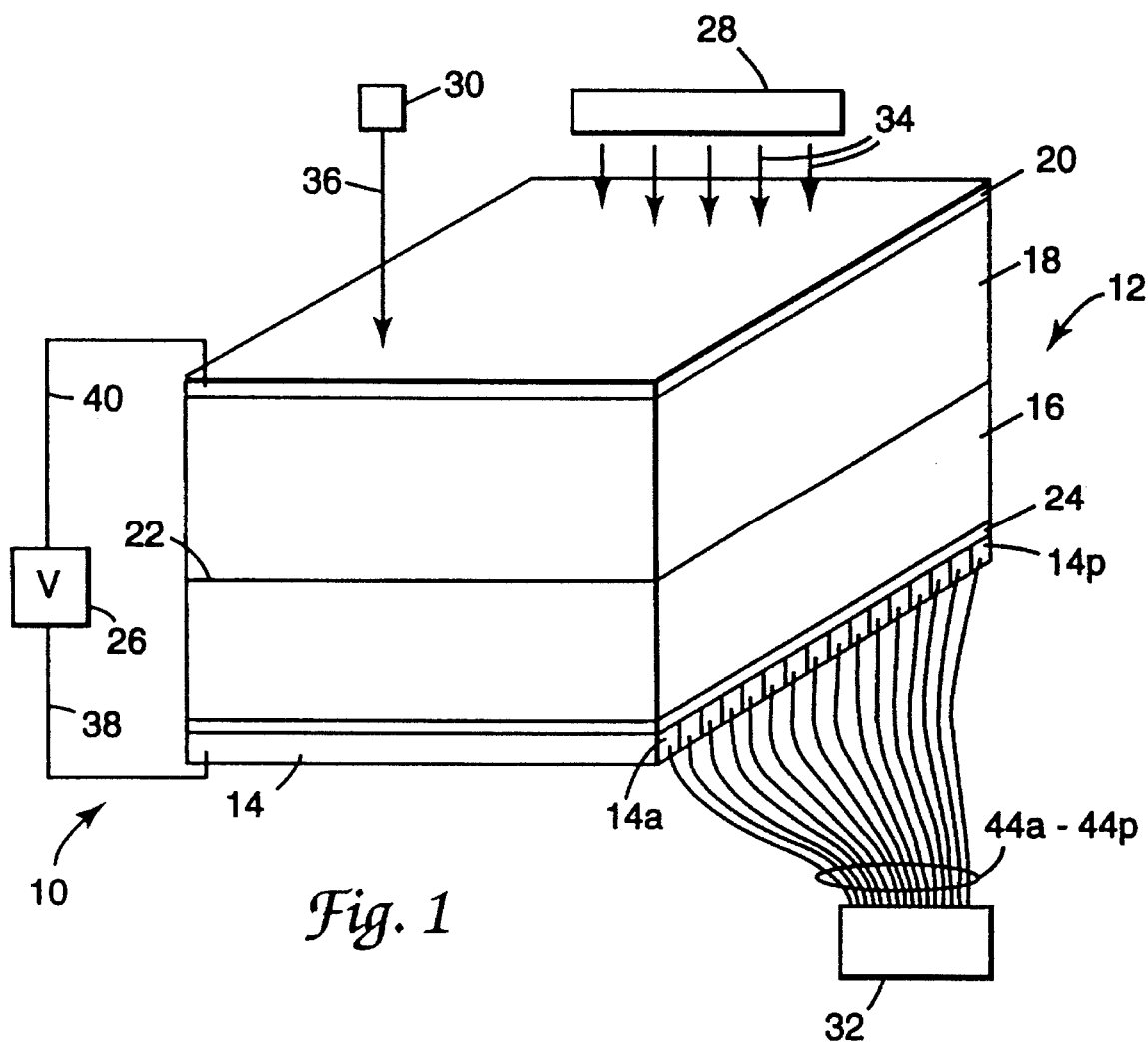
FIG. 1 is a schematic representation of a system for acquiring a digital image with a reusable radiation detector.

FIG. 1 is a schematic representation of a system 10 for acquiring a digital image in response to imaging radiation. The system 10 incorporates an exemplary reusable radiation detector 12 suitable for application of a conditioning system and method in accordance with the present invention. The detector 12 comprises a multilayered stack having a first conductive layer 14, a photoconductive layer 16 disposed adjacent the first conductive layer, an insulative layer 18 disposed adjacent the photoconductive layer opposite the first conductive layer, and a second conductive layer 20 disposed adjacent the insulative layer opposite the photoconductive layer. The first conductive layer 14 may be a planar sheet of conductive material or, as shown in FIG. 1, a segmented array of conductive electrodes 14a–14p arranged in a striped pattern across detector 12. Adjacent surfaces of photoconductive layer 16 and insulative layer 18 define a photoconductor-insulator interface 22. An example of a known radiation detector substantially conforming to that described above is disclosed in U.S. Pat. No. 4,176,275 to Korn and Nelson, the content of which is incorporated herein by reference.

A junction layer 24 is formed between first conductive layer 14 and photoconductive layer 16. A conditioning system and method, in accordance with the present invention, enables junction layer 24 to be realized as either a "rectifying" junction layer or a "blocking" junction layer. The term "rectifying" junction layer, as used herein, refers to a junction layer that is substantially electrically blocking to charge flow from photoconductive layer 16 to first conductive layer 14, but substantially electrically non-blocking to charge flow from the first conductive layer to the photoconductive layer. In contrast, the term "blocking" junction layer, as used herein, refers to a junction layer that, like a "rectifying" junction layer, is substantially electrically blocking to charge flow from photoconductive layer 16 to first conductive layer 14, but which, unlike a "rectifying" junction layer, is substantially electrically blocking to charge flow from the first conductive layer to the photoconductive layer. Thus, in accordance with the conditioning system and method of the present invention, junction layer 24 should be substantially electrically blocking to the flow of charge from photoconductive layer 16 to first conductive layer 14. However, junction layer 24 may be either substantially electrically non-blocking or substantially electrically blocking to the flow of charge from first conductive layer 14 to photoconductive layer 16. Consequently, detector 12 may, if desired, comprise a fully closed detector structure in which photoconductive layer 16 is enclosed by both insulative layer 18 and a "blocking" junction layer 24.

Numerous variations in the structure of detector 12 are conceivable. For example, the first and second conductive layers 14, 20 can be interchanged such that first conductive layer 14 is disposed adjacent insulative layer 18 and second conductive layer 20 is disposed adjacent photoconductive layer 16. In addition, detector 12 can be mounted on a substrate and/or a mechanical frame for added support. The layers of detector 12 can be formed from various materials providing suitable electrical and radiographic characteristics. If a substrate is employed, first conductive layer 14 can be formed over the substrate by depositing a planar sheet of conductive material. The segmented array of electrodes 14a–14p, as shown in FIG. 1, can be formed by etching the deposited planar sheet to define a suitable striped pattern. If a substrate is not employed, first conductive layer 14 can be formed by depositing a planar sheet on a surface of photoconductive layer 16, and then etching the sheet to define electrodes 14a–14p, as desired.

The photoconductive layer 16 preferably comprises amorphous selenium, which can be formed over first conductive layer 14 by conventional techniques, or formed as a separate layer to which conductive layer 14 can be added by deposition, as described above. However, photoconductive layer 16 may comprise other materials suitable for detecting radiation, such as lead oxide, cadmium sulfide, or mercurous iodide, as well as any of a variety of organic photoconductors. In general, photoconductive layer 16 should exhibit a low conductivity in the absence of imaging radiation, on the order of approximately $10^9$ ohm-centimeters or greater. The low conductivity enables an electric field to be maintained across detector 12 for an extended period of time without appreciable discharge. The photoconductive layer 16 also should be thick enough to absorb approximately 50 percent or more of the flux of the imaging radiation received by detector 12 during image exposure operations to form a satisfactory latent image. With amorphous selenium, for example, photoconductive layer 16 preferably has a thickness of approximately 250 to 550 microns.

The insulative layer 18 can be formed either from a material that is fluid at the operating temperature of detector 12, which may be a gaseous material such as air, or from a layer of non-fluid material. The insulative layer 18 typically has a thickness of approximately 100 to 300 microns. The insulative layer 18 can be formed by vapor deposition of a polymeric material, such as parylene-C, manufactured by Union Carbide, over photoconductive layer 16. The vapor deposition technique may be advantageous because it facilitates the formation of an insulative layer having uniform thickness. The insulative layer 18 alternatively can be realized by a flexible polymeric film that is bonded to the surface of photoconductive layer 16 opposite first conductive layer 14 with an optical adhesive, typically 1 to 30 microns thick. The second conductive layer 20 can be formed by evaporation of a conductive material over the surface of insulative layer 18 opposite photoconductive layer 16. If insulative layer 18 is formed separately from the stack as a polymeric film, second conductive layer 20 can be evaporated over the insulative layer either before or after bonding the film to photoconductive layer 16.

With reference to FIG. 1, system 10 further includes a voltage source 26, a first radiation source 28, a second radiation source 30, and a current detection circuit 32. For an image exposure operation, voltage source 26 applies an exposure voltage across detector 12. The first radiation source 28 then emits imaging radiation 34 that is received by detector 12, after passing through an object to be imaged. The object to be imaged alters the intensity of the imaging radiation 34 received by detector 12 in an image-wise pattern, resulting in the formation of a latent image representing the object, as described in U.S. Pat. No. 4,176,275. For an image read-out operation, voltage source 26 applies a read,out voltage across detector 12 while second radiation source 30 raster scans a pixel-sized beam 36 of readout radiation across detector 12 in a time-ordered pattern. The current detection circuit 32 detects and stores current flow values in synchronism with the time-ordered pattern scanned by beam 36 to produce a representation of the latent image, which may be in the form of a digital representation.

Figure 2:
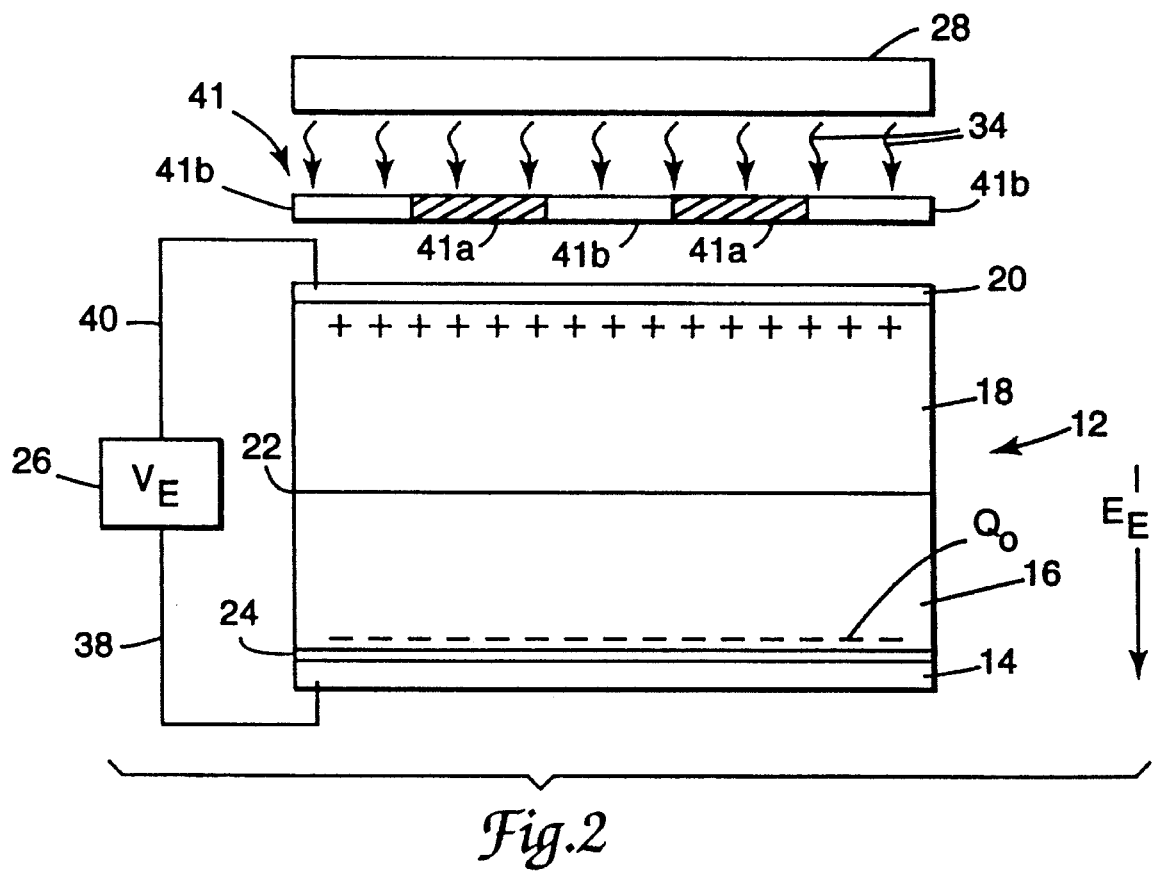
FIG. 2 is a schematic cross-sectional representation of the radiation detector shown in FIG. 1 during an image exposure operation.

The voltage source 26 has a first terminal coupled to first conductive layer 14, as indicated by line 38, and a second terminal coupled to second conductive layer 20, as indicated by line 40. FIG. 2 is a schematic cross-sectional representation of detector 12 during an image exposure operation, illustrating an example of initial charge distribution within the detector. As shown in FIG. 2, during the image exposure operation, voltage source 26 applies an exposure voltage $V_E$ that creates an electric field $E_E$ across detector 12. When amorphous selenium is used for photoconductive layer 16, the more mobile carriers are the holes. In this case, the exposure voltage $V_E$ applied by voltage source 26 preferably has a positive polarity at second conductive layer 20, as shown in FIG. 2. The voltage $V_E$ will be referred to as a "forward bias" voltage for the holes. The voltage source 26 alternatively may apply an exposure voltage $V_E$ having an opposite polarity across detector 12 while achieving satisfactory imaging performance. In such a case, the opposite polarity voltage would be referred to as a "forward bias" voltage for the less mobile electrons.

The photoconductive layer 16 absorbs a portion of imaging radiation 34 emitted by first radiation source 28. FIGS. 1 and 2 show imaging radiation 34 as being incident on detector 12 from the direction of second conductive layer 20. However, imaging radiation 34 may be incident from the direction of first conductive layer 14. In either case, the conductive layer 14, 20 through which photoconductive layer 16 receives imaging radiation 34 should be transparent to the wavelength of the imaging radiation. As an example, for imaging radiation 34, having an X-ray wavelength of approximately $10^{-8}$ to $10^{-11}$ meters, either first conductive layer 14 or second conductive layer 20 can be formed from thin metallic, e.g., aluminum, layers that are sufficiently transparent to X-rays. Alternatively, a deposited film of conducting, transparent indium tin oxide (ITO) may be suitable for formation of either first conductive layer 14 or second conductive layer 20. If photoconductive layer 16 also receives imaging radiation 34 through a substrate, the substrate should be transparent to the radiation.

The imaging radiation 34 is absorbed by photoconductive layer 16 in an image-wise pattern representing an object 41 to be imaged, which may be, for example, a portion of the human body, an industrial structure, or a contact film. The object 41, as shown in FIG. 2, includes substantially radiation-opaque areas 41a and less radiation-opaque areas 41b that determine the pattern of incident imaging radiation 34 received by detector 12. The absorbed radiation creates electron-hole pairs within photoconductive layer 16. The electric field $E_E$ separates the electron-hole pairs within photoconductive layer 16 to mobilize a set of charge carriers. The electric field $E_E$ generated by the exposure voltage $V_E$ typically has a field strength of approximately 5 to 15 volts/micron within photoconductive layer 16. In particular, field strengths in the higher end of this range provide more effective carrier separation within photoconductive layer 16.

The mobile carriers reduce the electric field $E_E$ across photoconductive layer 16 in an image-wise pattern. The charge carriers having a first polarity move to first conductive layer 14, whereas the charge carriers having a second, opposite polarity move to interface 22, resulting in the formation of a latent electrostatic image at the interface. For example, if photoconductive layer 16 comprises amorphous selenium and exposure voltage $V_E$ has a positive polarity at second conductive layer 20, the latent electrostatic image is formed by the collection of electrons at interface 22.

Figure 3:
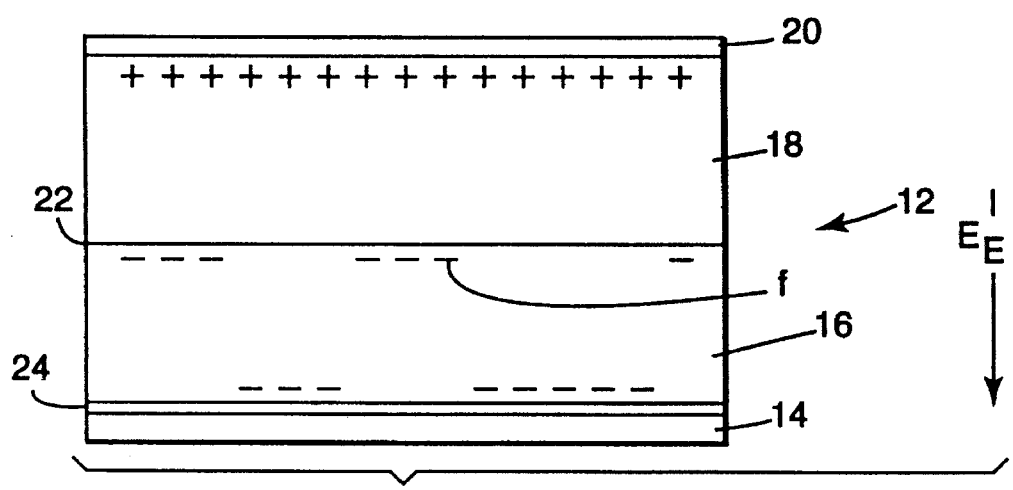
FIG. 3 is a schematic cross-sectional representation of the radiation detector shown in FIG. 1 illustrating an example of charge distribution after an image exposure operation.

As shown in FIG. 2, prior to the image exposure operation, a negative charge $Q_o$ exists at the first conductive layer 14, as determined by the exposure voltage $V_E$. FIG. 3 is a schematic cross-sectional representation of detector 12, illustrating an example of charge distribution within the detector after an image exposure operation. As shown in FIG. 3, the electric field $E_E$ causes a fraction f of the original charge $Q_o$ on first conductive layer 14 to reside at interface 22 in an image-wise pattern. The voltage source 26 simultaneously redistributes charge between first conductive layer 14 and second conductive layer 20 to maintain the potential difference $V_E$ across detector 12. The charge f remains at interface 22, however, thereby preserving the electrostatic latent image.

Figure 4:
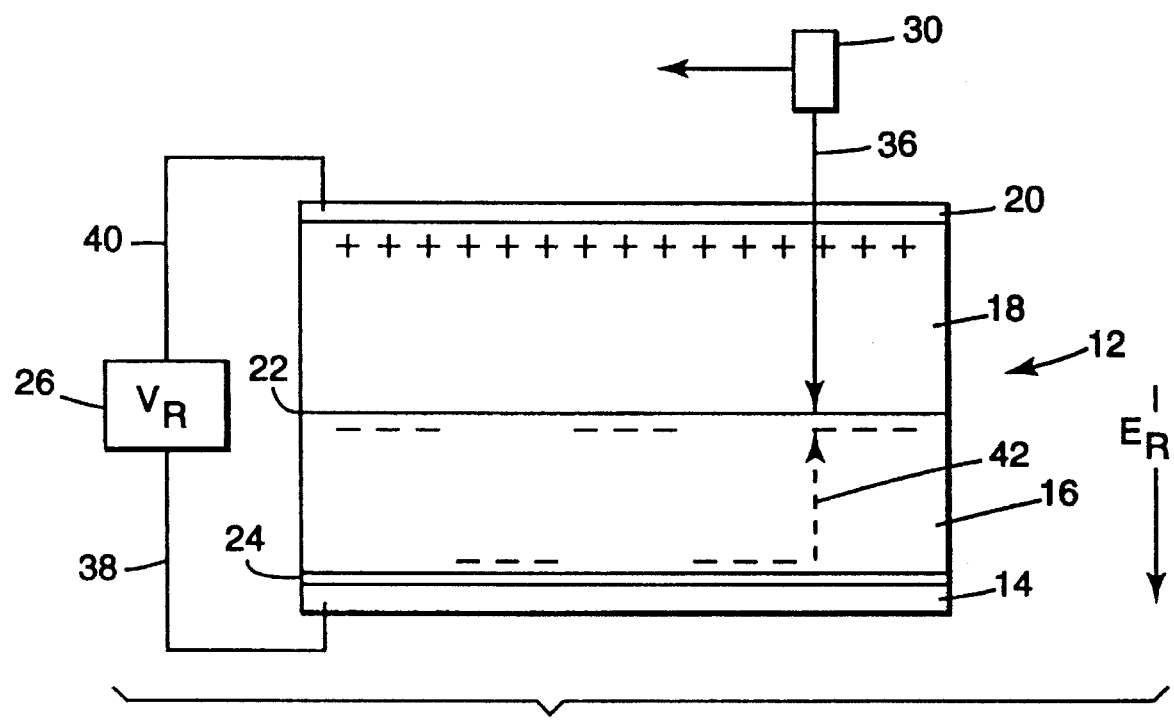
FIG. 4 is a schematic cross-sectional representation of the radiation detector shown in FIG. 1 during an image read-out operation.

FIG. 4 is a schematic cross-sectional representation of detector 12 illustrating charge distribution within the detector during an image read-out operation. As shown in FIG. 4, voltage source 26 applies a read-out voltage $V_R$ that creates a second electric field $E_R$ across detector 12. When amorphous selenium is used for photoconductive layer 16, the read-out voltage $V_R$ applied by voltage source 26 preferably has a positive polarity at second conductive layer 20. Like the exposure voltage $V_E$, the read-out voltage $V_R$ will be referred to as a "forward bias" voltage for the more mobile holes. The read-out voltage $V_R$ alternatively may have an opposite polarity across detector 12. In such a case, the opposite polarity voltage would be referred to as a "forward" bias voltage for the less mobile electrons. However, the polarity of the read-out voltage $V_R$ should be the same as the polarity of the exposure voltage $V_E$.

The second radiation source 30 scans beam 36 across detector 12 in a time-ordered pattern. The time-ordered pattern preferably comprises a raster pattern that scans a series of parallel lines, one at a time, until every pixel on detector 12 has been scanned. In the example of FIG. 4, beam 36 is shown as being scanned from right to left across detector 12. The scanning beam 36 may have a wavelength substantially similar to that of imaging radiation 34, or a substantially different wavelength. For example, beam 36 may comprise ultraviolet, visible, or infrared radiation, as appropriate to discharge the particular material selected for photoconductive layer 16. If amorphous selenium if used for photoconductive layer 16, for example, beam 36 may comprise visible radiation in the blue-green spectral range. A typical beam 36 employed in read-out operations is realized by a laser having a wavelength of approximately 488 nanometers.

FIGS. 1 and 4 show beam 36 as being incident on detector 12 from the direction of second conductive layer 20. However, beam 36 may be incident from the direction of first conductive layer 14. In either case, the conductive layer 14, 20 through which photoconductive layer 16 receives beam 36 should be transparent to the wavelength of the beam. A deposited film of conducting, transparent indium tin oxide (ITO), for example, may be suitable for formation of either first conductive layer 14 or second conductive layer 20. If photoconductive layer 16 receives beam 36 through a substrate, the substrate also should be transparent to the beam.

The photoconductive layer 16 absorbs a portion of the radiation transmitted by scanned beam 36 to create additional electron-hole pairs. The electric field $E_R$ applied across detector 12 separates the electron-hole pairs to mobilize a second set of charge carriers. The electric field $E_R$ typically has a field strength of approximately 1 to 5 volts/micron. As in the image exposure operation, the charge carriers of a first polarity move to first conductive layer 14, whereas the charge carriers of a second polarity move to interface 22. The charge movement caused by electric field $E_R$ substantially completes the local discharge of photoconductive layer 16 at each pixel point, as represented by the dashed arrow 42 in FIG. 4. The second radiation source 30 continues to scan beam 36 until every pixel has been addressed. The resulting charge movement at each pixel leads to further redistribution of charge between first conductive layer 14 and second conductive layer 20 by voltage source 26.

The current detection circuit 32 is coupled to electrodes 14a–14p, respectively, via channels 44a–44p, as shown in FIG. 1. The current detection circuit 32 detects the redistribution of charge between first conductive layer 14 and second conductive layer 20 as beam 36 scans each pixel. In this manner, current detection circuit 32 acquires a measure of local current flow at each pixel point. The imaged areas of photoconductive layer 16, which coincide with the latent image at interface 22, respond to beam 36 by producing less charge movement than non-imaged areas. The imaged areas produce less charge movement because less charge is necessary to complete the discharge of photoconductive layer 16 in the imaged areas of interface 22 where latent image charge has been collected. Consequently, the level of current detected by current detection circuit 32 varies as an imagewise function of the position of the scanned beam on photoconductive layer 16. The current detection circuit 32 processes the current level detected at each pixel point to generate a representation of the latent image.

Figure 5:
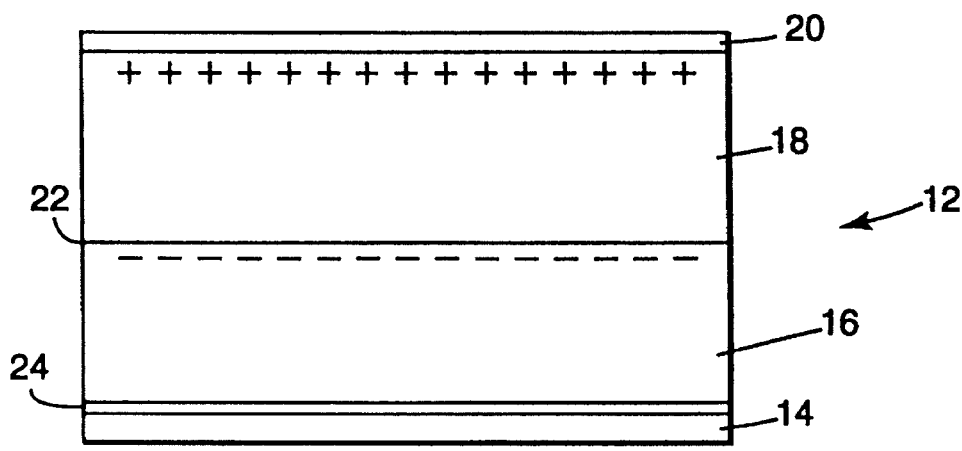
FIG. 5 is a schematic cross-sectional representation of the radiation detector shown in FIG. 1 illustrating an example of charge distribution after an image read-out operation.

FIG. 5 is a schematic cross-sectional representation of detector 12 illustrating an example of charge distribution within the detector after the image read-out operation. As shown in FIG. 5, the image exposure and image read-out operations result in the collection of both latent image charge and read-out charge at interface 22. To prepare the reusable detector 12 for a new imaging operation, the detector should be conditioned to redistribute this collected charge within photoconductive layer 16.

Figure 6:
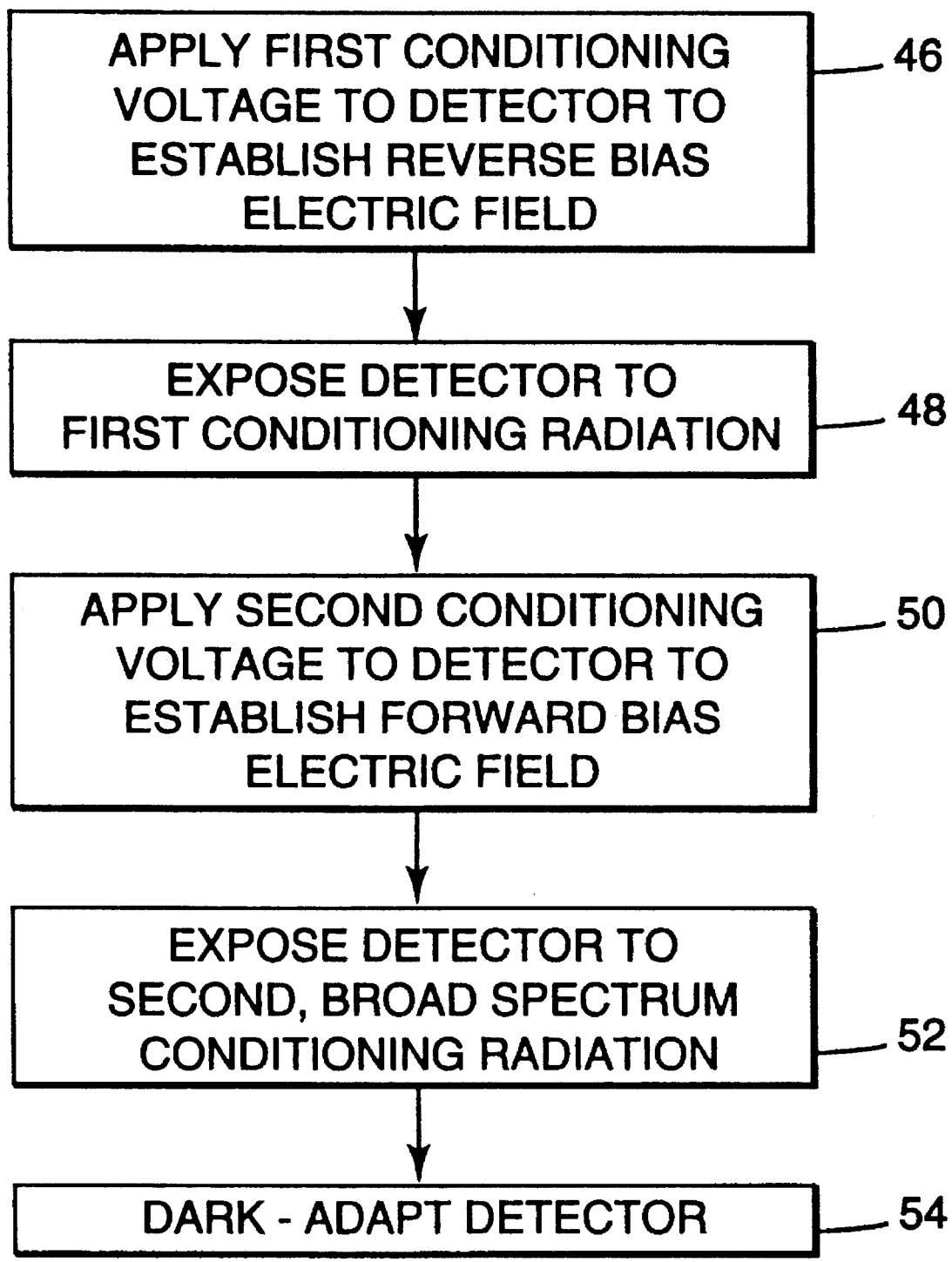
FIG. 6 is a flow diagram illustrating an exemplary embodiment of a method for conditioning a radiation detector in accordance with the present invention.

FIG. 6 is a flow diagram illustrating an exemplary embodiment of a method for conditioning detector 12, in accordance with the present invention. The conditioning method of the present invention achieves redistribution of the charge collected at interface 22 without the need for charge removal or charge injection methods. As indicated by block: 46 of FIG. 6, a first, reverse bias conditioning voltage is applied across first conductive layer 14 and second conductive layer 20 to establish a first, reverse bias electric field. While the first conditioning voltage is maintained across detector 12, photoconductive layer 16 is exposed for a period of time to first conditioning radiation having one or more wavelengths selected to penetrate at least a portion of the photoconductive layer, as indicated by block 48. The first conditioning radiation is selected to release charge carriers trapped within photoconductive layer 16, enabling the released charge carriers to transport in the first electric field established by the first conditioning voltage. In some circumstances it is conceivable that acceptable conditioning can be achieved by application of the first conditioning voltage and first conditioning radiation alone. For example, it may be sufficient that the application of the first conditioning voltage and first conditioning radiation result in a reproducible charge density state at interface 22, which serves as a starting point for the next image exposure operation.

To achieve more complete conditioning, however, a method in accordance with the present invention preferably is realized by the following additional steps. Specifically, a second, forward bias conditioning voltage, less than the first conditioning voltage, can be applied to first and second conductive layers 14, 20 to establish a second, forward bias electric field, as indicated by block 50. The second conditioning voltage preferably is achieved ;by shorting first conductive layer 14 and second conductive layer 20 to produce a voltage of approximately zero. While the second conditioning voltage is maintained across first and second conductive layers 14, 20, photoconductive layer 16 is exposed for a period of time to second, broad spectrum conditioning radiation, as indicated by block 52. As a further optional step, detector 12 then can be placed in a dark environment for a period of time, with first and second conductive layers 14, 20 shorted, to dark-adapt photoconductive layer 16, as indicated by block 54.

Figure 7:
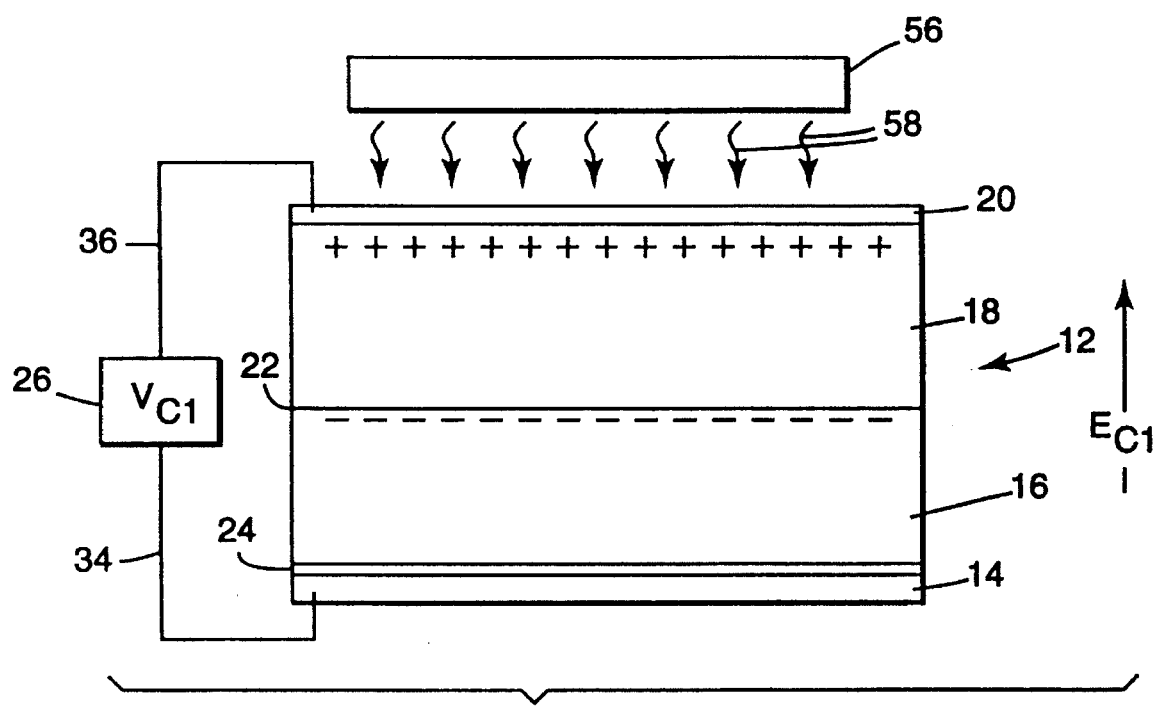
FIG. 7 is a schematic cross-sectional representation of the radiation detector shown in FIG. 1 during a first stage of a system and method for conditioning a radiation detector in accordance with the present invention.

FIG. 7 is a schematic cross-sectional representation of detector 12 during a first stage of the conditioning method of the present invention. As shown in FIG. 7, voltage source 26 applies the first conditioning voltage $V_{C1}$ across first and second conductive layers 14, 20 to establish the first electric field $E_{C1}$. The application of first conditioning voltage $V_{C1}$ corresponds to the step indicated in block 46 of FIG. 6. The conditioning voltage $V_{C1}$ is a reverse bias voltage relative to both the forward bias exposure voltage $V_E$ and the forward bias read-out voltage $V_R$ applied during the image exposure and image read-out operations, respectively. Thus, the resulting first electric field $E_{C1}$ similarly is a reverse bias field relative to fields $E_E$ and $E_R$ established during the image exposure and image read-out operations, respectively. If the image exposure and image read-out voltages $V_E$, $V_R$ are selected to have positive polarities at second conductive layer 20, as generally would be the case when photoconductive layer 16 comprises amorphous selenium, the oppositely poled conditioning voltage $V_{C1}$ then is selected to have a positive polarity at first conductive layer 14. The polarities of the image exposure voltage $V_E$, image read-out voltage $V_R$, and first conditioning voltage $V_{C1}$ can, of course, be reversed according to the needs of the system user and/or the type of material used to form photoconductive layer 16.

While first conditioning voltage $V_{C1}$ is maintained, a first conditioning radiation source 56 exposes photoconductive layer 16 to first conditioning radiation 58, as also shown in FIG. 7. The application of first conditioning radiation 58 corresponds to the step indicated in block 48 of FIG. 6. The first conditioning radiation 58 contains wavelengths selected to penetrate at least a portion of photoconductive layer 16. The photons transmitted with first conditioning radiation 58 release holes and electrons from trap sites at interface 22. For enhanced conditioning, it is preferred that first conditioning radiation 58 also contain wavelengths selected to penetrate deep within the bulk of photoconductive layer 16 to release holes and electrons from distributed trap sites.

Once first conditioning radiation 58 releases the trapped charge carriers, they are free to transport within the reverse bias electric field $E_{C1}$, along with charge carriers not held in trap sites, resulting in redistribution of charge supporting the latent image at interface 22.

The first conditioning radiation 58 releases, in particular, a portion of the charge carriers held in trap sites at interface 22, enabling the released charge carriers to leave the interface by light excitation and transport away from the interface in the reverse bias field $E_{C1}$. The collected charge carriers not held in interface trap sites are also free to transport away from interface 22 in field $E_{C1}$, thereby contributing to redistribution of the latent image at the interface. At the same time, first conditioning radiation 58 releases charge carriers having a polarity opposite to that of the charge collected at interface 22. The oppositely poled charge carriers released by radiation 58 are thereby free to transport toward interface 22 in the reverse bias field $E_{C1}$, along with oppositely poled charge carriers not held in trap sites, to neutralize the remaining charge carriers collected at the interface. The opposite poled charge carriers also accumulate at interface 22 in excess of the original latent image charge.

If photoconductive layer 16 comprises amorphous selenium and image exposure voltage $E_E$ has a positive polarity at second conductive layer 20, for example, the charge collected at interface 22 is negative, as shown in FIG. 7. The first conditioning radiation 58 releases a portion of the electrons and holes held in trap sites at interface 22, as well as electrons and holes held in distributed trap sites deep within photoconductive layer 16. The electrons released from interface trap sites leave interface 22 by light excitation and transport away from the interface in the reverse bias field $E_{C1}$. The holes released from interface trap sites and distributed trap sites transport in the opposite direction toward interface 22 to neutralize remaining electrons. Thus, the redistributive effect is achieved both by transport and neutralization of electrons collected at interface 22.

The wavelength of first conditioning radiation 58 sufficient to release a satisfactory amount of trapped charge carriers inevitably will vary with the absorption versus wavelength characteristic of the particular photoconductive material chosen for photoconductive layer 16, as well as the intensity and exposure time of the first conditioning radiation. In addition, the optimum wavelength of first conditioning radiation 58 will depend on the density of deep trap sites within photoconductive layer 16 and the spatial distribution of such trap sites throughout the photoconductive layer. The absorption versus wavelength characteristic of the photoconductive material determines the number of photons that will be absorbed at a particular wavelength before actually reaching trapped charge carriers at a unit depth within photoconductive layer 16. The absorption versus wavelength characteristic of insulative layer 18 generally can be disregarded if a proper choice of materials is made. The total number of photons transmitted via first conditioning radiation 58, notwithstanding absorption, is a function of the intensity of the conditioning radiation and the exposure time.

The absorption edge of a photoconductive material refers to a wavelength at which substantially all of the incident radiation is absorbed within the first micron of depth. Effective redistribution of trapped charge carriers can be achieved, in accordance with the present invention, by exposing photoconductive layer 16 to first conditioning radiation 58 that does not include wavelengths greater than the pertinent absorption edge wavelength, provided intensity and/or exposure time are increased to compensate for excessive absorption. However, the need for higher energies and/or longer exposure times is inefficient, and therefore may be unacceptable to the user. Thus, to achieve more efficient redistribution for photoconductive materials having a significant degree of trapping within the bulk, first conditioning radiation 58 should contain wavelengths that are not substantially less than the absorption edge wavelength of the chosen photoconductive material, and preferably contains wavelengths greater than the absorption edge wavelength.

For example, when photoconductive layer 16 is formed with amorphous selenium, the pertinent absorption edge wavelength is approximately 520 nanometers. Effective redistribution can be achieved by exposing the amorphous selenium photoconductive layer 16 to first conditioning radiation 58 that does not include wavelengths greater than approximately 520 nanometers. However, to realize effective redistribution with a lower intensity level and shorter exposure time, photoconductive layer 16 preferably is exposed to conditioning radiation 58 including wavelengths greater than or equal to approximately 500 nanometers. In particular, first conditioning radiation 58 having wavelengths greater than or equal to approximately 600 nanometers should be effective in releasing a sufficient amount of trapped charge carriers in a relatively short amount of time when amorphous selenium is used.

The reverse bias field $E_{C1}$ should have a strength sufficient to achieve effective redistributive transport of charge carriers released from trap sites by first conditioning radiation 58, as well as charge carriers not held in trap sites. The appropriate strength of the first conditioning field $E_{C1}$ will vary with the strength of the image readout field $E_R$, which normally is the major factor in the amount of charge collected at photoconductor-insulator interface 22. A conditioning field strength suitable to redistribute the charge transported to interface 22 in the readout field $E_R$ can be generated by a first conditioning voltage $V_{C1}$ having an absolute value on the order of approximately 0.2 to 1.0 times the image readout voltage $V_R$. In particular, a conditioning voltage $V_{C1}$ of approximately 0.5 times the value of the image readout voltage $V_R$ has been found to establish a reverse bias field $E_{C1}$ providing effective redistributive transport. A first conditioning voltage $V_{C1}$ less than the above range may generate a weak field producing insufficient transport, whereas a first conditioning voltage $V_{C1}$ substantially greater than the above range may create an excessive boost field at interface 22 that can complicate redistribution in a second stage of the conditioning method, to be discussed. Therefore, although a first conditioning voltage $V_{C1}$ having a value outside of the above range may support acceptable conditioning, such considerations may justify operation within the stated range in certain applications.

As an example, a typical image readout voltage $V_R$ could have a value of approximately 1000 to 3000 volts when detector 12 is formed with an amorphous selenium photoconductive layer 16 having a thickness of approximately 425 microns and an insulative layer 18 having a thickness of approximately 175 microns. For the above configuration with a readout voltage of 3000 volts, in particular, a suitable conditioning voltage $V_{C1}$ preferably would be approximately 0.2 to 1.0 times the image readout voltage $V_R$, falling in a range of approximately −600 to −3000 volts. More specifically, for the above configuration, effective transport has been observed with a conditioning voltage $V_{C1}$ of approximately −1500 volts, which corresponds to a field strength of approximately 1.2 volts/micron.

For effective conditioning, the simultaneous application of first conditioning radiation 58 and reverse bias field $E_{C1}$ should be maintained for a period of time sufficient to allow redistribution of substantially all of the charge collected at interface 22. The period of time required for effective redistribution varies with the strength of the reverse bias field $E_{C1}$, the amount of charge collected at interface 22, and the intensity of first conditioning radiation 58. As an example, however, when photoconductive layer 12 is formed with an amorphous selenium photoconductive layer 16 having a thickness of approximately 425 microns and an insulative layer 18 having a thickness of approximately 175 microns, a conditioning voltage $V_{C1}$ of approximately −1500 volts (relative to a readout voltage $V_R$ of approximately 3000 volts) and a first conditioning radiation 58 having wavelengths greater than or equal to approximately 600 nanometers and an intensity of approximately 0.1 watt/cm$^2$ should provide effective redistribution when applied for a period of time of at least one second, with longer periods of time approaching ten seconds providing better results.

Figure 8:
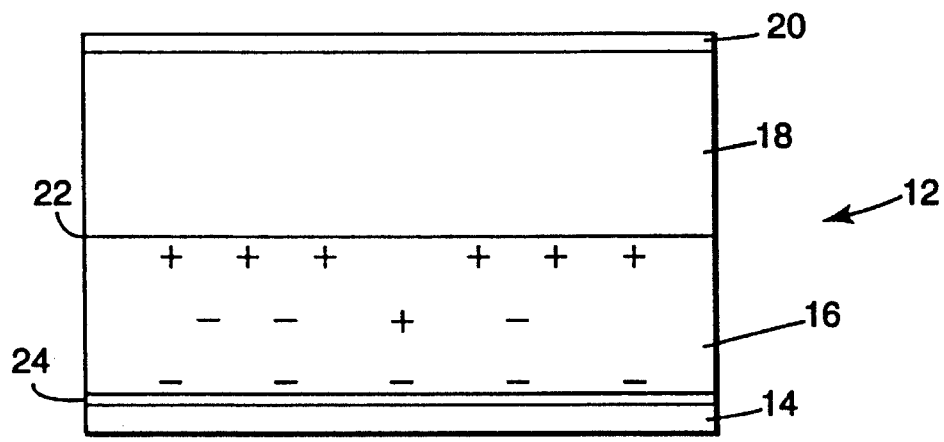
FIG. 8 is a schematic cross-sectional representation of the radiation detector shown in FIG. 1 illustrating an example of Charge distribution after the conditioning stage of FIG. 7.

FIG. 8 is a schematic cross-sectional representation of radiation detector 12 illustrating an example of charge distribution after the conditioning stage of FIG. 7. As shown in FIG. 8, the reverse bias field $E_{C1}$ transports the collected charge away from interface 22, but may result in an interface charge density that contains excess neutralizing carriers of the opposite polarity. With a photoconductive layer 16 formed from amorphous selenium and an image exposure voltage $V_E$ having a positive polarity at second conductive layer 20, for example, the reverse bias field $E_{C1}$ transports both free and released electrons forming the latent image charge and read-out charge away from interface 22. However, the reverse bias field $E_{C1}$ also may transport more holes toward interface 22 than are necessary for neutralization, resulting in a positive charge density. The amount of excess neutralizing charge collected at interface 22 may be acceptable for some applications. For more complete conditioning of detector 12, however, the excess charge optionally can be redistributed.

Figure 9:
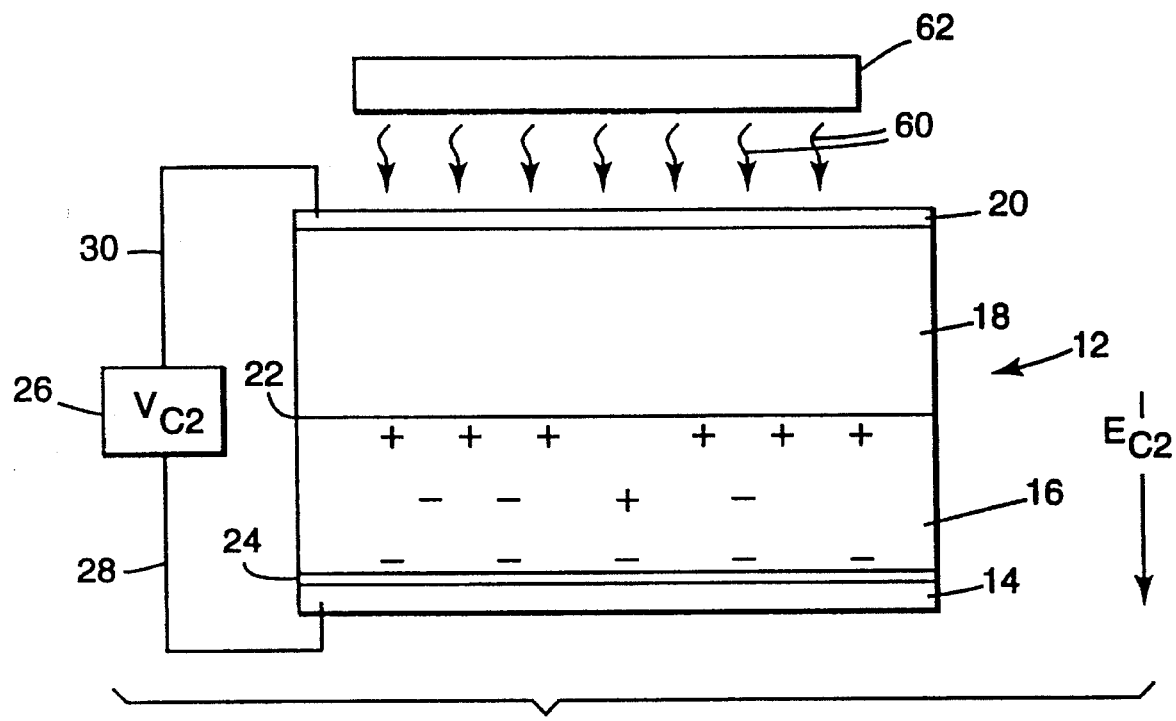
FIG. 9 is a schematic cross-sectional, representation of the radiation detector shown in FIG. 1 during another stage in a system and method for conditioning a radiation detector in accordance with the present invention.

FIG. 9 is a schematic cross-sectional representation of detector 12 during another stage in the conditioning method of the present invention. As shown in FIG. 9, the excess neutralizing charge at interface 22 is redistributed by applying a second conditioning voltage $V_{C2}$ across first conductive layer 14 and second conductive layer 20, and exposing photoconductive layer 16 to second conditioning radiation 60 emitted by a second radiation source 62. The application of the second condition conditioning voltage $V_{C2}$ and second conditioning radiation 60 corresponds to the steps indicated in blocks 50 and 52, respectively, of FIG. 6. The second conditioning voltage should have an absolute value less than that of the first conditioning voltage $V_{C1}$ to establish a second, forward bias electric field $E_{C2}$ across photoconductive layer 16. The forward bias electric field $E_{C2}$ preferably is realized by simply shorting first and second conductive layers 14, 20 together, such that the second conditioning voltage $V_{C2}$ is approximately zero volts. A second conditioning voltage $V_{C2}$ of approximately zero volts avoids the reaccumulation of latent image charge at interface 22.

The second, broad spectrum radiation 60 can be realized, for example, by an incandescent light. The broad spectrum radiation excites photoconductive layer 16 to a limited degree sufficient to enable excess neutralizing charge collected at interface 22 to transport back toward junction layer 24 in the forward bias field $E_{C2}$. The strength of the forward bias field $E_{C2}$ should be sufficient to transport substantially all of the excess neutralizing charge away from interface 22, but should be much less than the strength of the reverse bias electric field $E_{C1}$ to avoid the transport of oppositely poled charge back to interface 22. Thus, although small, non-zero voltages may be used for second conditioning voltage $V_{C2}$, the use of large voltages, relative to first conditioning voltage $V_{C1}$, generally is undesirable. In particular, the shorting of first and second conductive layers 14, 20 should establish a forward bias field $E_{C2}$ of sufficient strength to transport excess charge from interface 22 over a period of time without causing the collection of oppositely poled charge at the interface.

The simultaneous application of second conditioning radiation 60 and forward bias field $E_{C2}$ should be maintained for a period of time sufficient to allow redistribution of substantially all of the excess neutralizing charge collected at interface 22. This period of time varies with the amount of charge collected at interface 22, the strength of the reverse bias field $E_{C2}$, and the intensity of second conditioning radiation 60. If forward bias field $E_{C2}$ is produced by shorting first and second conductive layers 14, 20, the field strength is a direct function of the strength of the reverse bias field $E_{C1}$. For a photoconductive layer 16 of amorphous selenium subjected to a typical image exposure operation, for example, a second conditioning voltage $V_{C2}$ of approximately zero volts and second, broad spectrum conditioning radiation 60 having an intensity of approximately 0.2 watt/cm$^2$ should provide effective redistribution of the excess neutralizing charge when applied for a period of time of at least one second, with longer periods of time approaching approximately ten seconds providing better results.

Figure 10:
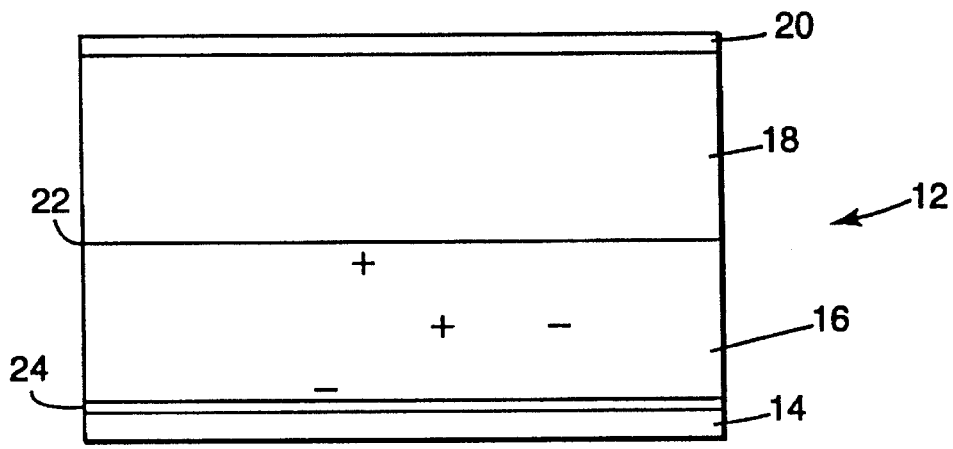
FIG. 10 is a schematic cross-sectional representation of the radiation detector shown in FIG. 1 illustrating an example of Charge distribution after the conditioning stage of FIG. 9.

FIG. 10 is a schematic cross-sectional representation of detector 12 after the conditioning stage of FIG. 9. As shown in FIG. 10, the application of second conditioning voltage $V_{C2}$ in combination with the exposure of photoconductive layer 16 to second, broad spectrum radiation 60 results in the redistribution of substantially all neutralizing charge collected at interface 22. However, a small number of free charge carriers may remain in photoconductive layer 16. The presence of a small number of free charge carriers may be acceptable for some applications, but may contribute to undesirable dark current when the image exposure field $E_E$ is applied for the next image exposure operation. Therefore, the free charge carriers optionally can be eliminated by an additional step.

Specifically, the free charge carriers can be readily eliminated by placing detector 12 in a dark environment for a period of time, with first conductive layer 14 and second conductive layer 20 shorted together, to dark-adapt photoconductive layer 16. This dark-adaptation period corresponds to the step indicated in block 54 of FIG. 6. The dark environment allows some of the free charge carriers to transport to reduce residual fields within photoconductive layer 16, but also changes the conductive state of the photoconductive material to capture some of the free charge carriers in distributed traps. The transported and trapped carriers reduce the number of carriers able to contribute to dark current at the start of the next image exposure operation. The photoconductive layer 16 can be effectively dark-adapted by placing it in a dark environment for an indefinite amount of time. However, a minimum dark adaptation time of at least two minutes should sufficiently reduce dark current, thereby preserving image contrast.

The following examples are provided to illustrate the conditioning method of the present invention, and, in particular, the effectiveness of the conditioning method of the present invention for reusable radiation detectors having either "rectifying" or "blocking" junction layers.

EXAMPLE 1

A detector 12 having a structure substantially as described in FIG. 1 was used in this example. The first conductive layer 14 comprised an aluminum plate substrate having a width of approximately 12.7 centimeters, a length of approximately 12.7 centimeters, and a thickness of approximately 0.2 centimeters. A rectifying junction layer 24 was formed over the aluminum plate substrate of first conductive layer 14 by plasma oxidation. The photoconductive layer 16, formed over junction layer 24, comprised a vacuum deposited layer of amorphous selenium having a thickness of approximately 425 microns. The insulative layer 18 was a parylene film, having a thickness of approximately 175 microns, bonded to the surface of photoconductive layer 16 opposite first conductive layer 14 by an optical adhesive having a thickness of approximately 10 microns. A film of conducting, transparent indium tin oxide, having a thickness of approximately 0.9 microns, was deposited over the surface of insulative layer 18 opposite photoconductive layer 16 to form second conductive layer 20.

An image exposure operation was performed by applying an image exposure voltage $V_E$ of approximately 7000 volts, and then exposing photoconductive layer 16 to X-ray imaging radiation having a wavelength in the range of $10^{-8}$ to $10^{-11}$ meters, via second conductive layer 20 and insulative layer 18. After the resulting first image was read-out with a readout voltage $V_R$ of approximately 2000 volts and a scanning beam having a wavelength of approximately 488 nanometers, detector 12 was conditioned according to the known charge injection method by shorting first conductive layer 14 and second conductive layer 20 together for a period of approximately twenty minutes after an initial ten-second exposure to room light. A second image then was formed with detector 12, and was found to have nearly the same image contrast as the first image (104 pixel values versus 121 pixel values). The image contrast of the second image demonstrated that junction layer 24 exhibited reverse-bias injecting behavior.

The detector 12 was then conditioned in accordance with the system and method of the present invention. A first, reverse bias conditioning voltage $V_{C1}$ of approximately –2000 volts was applied to the second conductive layer 20 relative to the first conductive layer 14. While the first conditioning voltage was maintained, the photoconductive layer 16 was exposed to first conditioning radiation for a period of approximately ten seconds. The first conditioning radiation was generated by filtering an incandescent light source using a Wrattan 1A filter to pass wavelengths in a range of approximately 550 to 900 nanometers. The resulting radiation was estimated to have an intensity of approximately 0.1 watt/cm$^2$. The first conditioning radiation alternatively could be generated by operating an incandescent light at low voltage to produce wavelengths falling in the red spectral range. The first and second conductive layers 14, 20 were then shorted together, and photoconductive layer 16 was exposed to second, broad spectrum conditioning radiation provided by an incandescent light for a period of approximately ten seconds. The broad spectrum conditioning radiation was estimated to have an intensity of approximately 0.2 watt/cm$^2$. Finally, detector 12 was placed in a dark environment, with first and second conductive layers 14, 20 shorted together, for a period of approximately twenty minutes.

A third image was then formed with detector 12, and was observed to have an image contrast essentially the same as that of the first image (119 pixel values versus 121 pixel values). Thus, the conditioning performed in accordance with the system and method of the present invention provided effective conditioning for a detector 12 having a "rectifying" junction layer 24 with reverse bias charge injection properties.

EXAMPLE 2

A second detector 12 having a structure substantially identical to that employed in EXAMPLE 1 was used, except that junction layer 24 was formed by plasma anodization of the aluminum first conductive layer 14 to a thickness of approximately 150 Angstrom to realize a "blocking" junction layer. The "blocking" junction layer 24 was designed to substantially electrically block charge flow in both forward and reverse bias directions. Thus, blocking junction layer 24 was designed to substantially electrically block charge flow from first conductive layer 14 to photoconductive layer 16, and to substantially electrically block charge flow from the photoconductive layer to the first conductive layer.

A first image was formed with detector 12 and read out via the image exposure and image read-out operations described in EXAMPLE 1. The detector 12 was then conditioned according to the known charge injection method by shorting first conductive layer 14 and second conductive layer 20 together for a period of approximately twenty minutes after an initial ten-second exposure to room light. A second image then was formed with detector 12, and was found to have significantly lower image contrast than that of the first image (125 pixel values versus 241 pixel values). The image contrast of the second image demonstrated that junction layer 24 exhibited very limited reverse-bias injecting behavior, and therefore could be characterized as a "blocking" junction layer.

The detector 12 was then conditioned in accordance with the system and method of the present invention. As in the case of Example 1, a first, reverse bias conditioning voltage $V_{C1}$ of approximately –2000 volts was applied to the second conductive layer 20 relative to the first conductive layer 14. While the first conditioning voltage was maintained, photoconductive layer 16 was exposed to first conditioning radiation for a period of approximately ten seconds. The first conditioning radiation again included wavelengths in a range of approximately 550 to 900 nanometers, and had an estimated intensity of approximately 0.1 watt/cm$^2$. The first and second conductive layers 14, 20 were then shorted together, and photoconductive layer 16 was exposed to second, broad spectrum conditioning radiation, having an estimated intensity of approximately 0.2 watt/cm$^2$ for a period of approximately ten seconds. Finally, detector 12 was placed in a dark environment, with first and second conductive layers 14, 20 shorted together, for a period of approximately twenty minutes.

A third image was then formed with detector 12, and was observed to have an image contrast essentially the same as that of the first image (215 pixel values versus 241 pixel values). Thus, the conditioning performed in accordance with the system and method of the present invention also provided effective conditioning for a detector 12 having a "blocking" junction layer 24.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A method for conditioning a radiation detector having a first conductive layer, a photoconductive layer disposed adjacent said first conductive layer, an insulative layer disposed adjacent said photoconductive layer opposite said first conductive layer, and a second conductive layer disposed adjacent said insulative layer opposite said photoconductive layer, said radiation detector forming a latent image in response to both application of an image exposure voltage across said first conductive layer and said second conductive layer and exposure of said detector to imaging radiation, and said latent image being read out during application of an image readout voltage across said first conductive layer and said second conductive layer and exposure of said detector to readout radiation, the conditioning method comprising the steps of:

applying a first conditioning voltage across said first conductive layer and said second conductive layer, said first conditioning voltage having a polarity opposite to a polarity of both said image exposure voltage and said image readout voltage, wherein said first conditioning voltage establishes a first electric field across said photoconductive layer;

exposing said photoconductive layer to first conditioning radiation having one or more wavelengths selected to penetrate at least a portion of said photoconductive layer, thereby releasing charge carriers trapped within said photoconductive layer to transport within said first electric field;

applying a second conditioning voltage across said first conductive layer and said second conductive layer, an absolute value of said second conditioning voltage being less than said first conditioning voltage, wherein said second conditioning voltage establishes a second electric field across said photoconductive layer in a direction opposite to said first electric field;

exposing said photoconductive layer to second conditioning radiation, wherein said photoconductive layer comprises a photoconductive material having an absorption edge, said second conditioning radiation including radiation having wavelengths less than a wavelength corresponding to said absorption edge; and dark-adapting said photoconductive layer.

2. The conditioning method of claim 1, wherein an absolute value of said first conditioning voltage is a factor of approximately 0.2 to 1.0 times an absolute value of said image readout voltage.

3. The conditioning method of claim 1, wherein an absolute value of said first conditioning voltage is a factor of approximately 0.5 times an absolute value of said image readout voltage.

4. The conditioning method of claim 1, wherein said photoconductive layer comprises amorphous selenium, an absolute value of said image readout voltage is in a range of approximately 1000 to 3000 volts, and an absolute value of said first conditioning voltage is in a range of approximately 200 to 3000 volts.

5. The conditioning method of claim 1, wherein said first conditioning radiation includes one or more wavelengths greater than or equal to a wavelength corresponding to said absorption edge.

6. The conditioning method of claim 1, wherein said photoconductive layer comprises amorphous selenium, and said first conditioning radiation includes one or more wavelengths greater than or equal to approximately 500 nanometers.

7. The conditioning method of claim 1, wherein said photoconductive layer comprises amorphous selenium, and said first conditioning radiation includes one or more wavelengths greater than or equal to approximately 600 nanometers.

8. The conditioning method of claim 1, wherein said step of applying said second conditioning voltage includes shorting said first and second conductive layers together, said second conditioning voltage thereby being approximately 0 volts.

9. The conditioning method of claim 1, wherein said photoconductive layer comprises amorphous selenium.

10. The conditioning method of claim 1, wherein said first conditioning radiation includes one or more wavelengths selected to release some of said charge carriers from interface trap sites at an interface between said photoconductive layer and said insulative layer, and one or more wavelengths selected to release some of said charge carriers from distributed trap sites within said photoconductive layer, at least some of the charge carriers released by said first conditioning radiation being transported in said first electric field established by said first conditioning voltage.

11. The conditioning method of claim 1, wherein said radiation detector includes a junction layer formed between said first conductive layer and said photoconductive layer, said junction layer being substantially electrically blocking to charge flow from said first conductive layer to said photoconductive layer, and said junction layer being substantially electrically blocking to charge flow from said photoconductive layer to said first conductive layer.

12. The conditioning method of claim 1, wherein said radiation detector is an X-ray detector, said imaging radiation being X-ray imaging radiation.

13. The conditioning method of claim 1, wherein said first conditioning radiation consists essentially of radiation having wavelengths greater than or equal to a wavelength corresponding to said absorption edge.

14. The conditioning method of claim 1, wherein said first conditioning radiation consists essentially of radiation passed through a Wrattan 1A filter.

15. The conditioning method of claim 1, wherein said first conditioning radiation consists essentially of radiation having wavelengths in the range of approximately 550 to 900 nanometers.

16. The conditioning method of claim 1, wherein said second conditioning radiation is broad-spectrum radiation.

17. A method for conditioning a radiation detector having a first conductive layer, a photoconductive layer disposed adjacent said first conductive layer, an insulative layer disposed adjacent said photoconductive layer opposite said first conductive layer, and a second conductive layer disposed adjacent said insulative layer opposite said photoconductive layer, said radiation detector forming a latent image in response to both application of an image exposure voltage across said first conductive layer and said second conductive layer and exposure to imaging radiation, and said latent image being read out during application of an image readout voltage across said first conductive layer and said second conductive layer and exposure of said detector to readout radiation, the conditioning method comprising the steps of:

applying a first conditioning voltage across said first conductive layer and said second conductive layer, said first conditioning voltage having a polarity opposite to a polarity of both said image exposure voltage and said image readout voltage, wherein said first conditioning voltage establishes a first electric field across said photoconductive layer; and exposing said photoconductive layer to first conditioning radiation having one or more wavelengths selected to penetrate at least a portion of said photoconductive layer, thereby releasing charge carriers trapped within said photoconductive layer to transport within said first electric field, wherein said photoconductive layer comprises a photoconductive material having an absorption edge, and said first conditioning radiation consists essentially of radiation having wavelengths greater than or equal to a wavelength corresponding to said absorption edge.

18. The conditioning method of claim 17, wherein an absolute value of said first conditioning voltage is a factor of approximately 0.2 to 1.0 times an absolute value of said image readout voltage.

19. The conditioning method of claim 17, wherein an absolute value of said first conditioning voltage is a factor of approximately 0.5 times an absolute value of said image readout voltage.

20. The conditioning method of claim 17, wherein said photoconductive layer comprises amorphous selenium, an absolute value of said image readout voltage is in a range of approximately 1000 to 3000 volts, and an absolute value of said first conditioning voltage is in a range of approximately 200 to 3000 volts.

21. The conditioning method of claim 17, wherein said photoconductive layer comprises amorphous selenium, and said first conditioning radiation consists essentially of radiation having wavelengths greater than or equal to approximately 500 nanometers.

22. The conditioning method of claim 17, wherein said photoconductive layer comprises amorphous selenium, and said first conditioning radiation consists essentially of radiation having wavelengths greater than or equal to approximately 600 nanometers.

23. The conditioning method of claim 17, wherein said photoconductive layer comprises amorphous selenium.

24. The conditioning method of claim 17, wherein said radiation detector includes a junction layer formed between said first conductive layer and said photoconductive layer, said junction layer being substantially electrically blocking to charge flow from said first conductive layer to said photoconductive layer, and said junction layer being substantially electrically blocking to charge flow from said photoconductive layer to said first conductive layer.

25. The conditioning method of claim 17, further comprising, after said step of exposing said photoconductive layer to said first conditioning radiation, the steps of:
applying a second conditioning voltage across said first conductive layer and said second conductive layer, an absolute value of said second conditioning voltage being less than said first conditioning voltage, wherein said second conditioning voltage establishes a second electric field across said photoconductive layer in a direction opposite to said first electric field; and
exposing said photoconductive layer to second conditioning radiation, said Second conditioning radiation including radiation having wavelengths less than a wavelength corresponding to said absorption edge.

26. The conditioning method of claim 25, wherein said second conditioning radiation is broad-spectrum radiation.

27. The conditioning method of claim 17, further comprising, after said step of exposing said photoconductive layer to said first conditioning radiation, the step of dark-adapting said photoconductive layer.

28. The conditioning method of claim 17, wherein said radiation detector is an X-ray detector, said imaging radiation being X-ray imaging radiation.

29. The conditioning method of claim 17, wherein said first conditioning radiation consists essentially of radiation passed through a Wrattan 1A filter.

30. The conditioning method of claim 17, wherein said first conditioning radiation consists essentially of radiation having wavelengths in the range of approximately 550 to 900 nanometers.

31. A method for conditioning a radiation detector having a first conductive layer, a photoconductive layer having amorphous selenium disposed adjacent said first conductive layer, an insulative layer disposed adjacent said photoconductive layer opposite said first conductive layer, and a second conductive layer disposed adjacent said insulative layer opposite said photoconductive layer, said radiation detector forming a latent image in response to both application of an image exposure voltage across said first conductive layer and said second conductive layer and exposure to imaging radiation, and said latent image being read out during application of an image readout voltage across said first conductive layer and said second conductive layer and exposure of said detector to readout radiation, the conditioning method comprising the steps of:
applying a first conditioning voltage across said first conductive layer and said second conductive layer, said first conditioning voltage having a polarity opposite to a polarity of both said image exposure voltage and said image readout voltage, and an absolute value of said first conditioning voltage being a factor of approximately 0.2 to 1.0 times an absolute value of said image readout voltage, wherein said first conditioning voltage establishes a first electric field across said photoconductive layer;
exposing said photoconductive layer to first conditioning radiation having one or more wavelengths selected to penetrate at least a portion of said photoconductive layer, thereby releasing charge carriers trapped within said photoconductive layer to transport within said first electric field, said first conditioning radiation including one or more wavelengths greater than or equal to 600 nanometers;
shorting said first conductive layer and said second conductive layer together to establish a second electric field across said photoconductive layer in a direction opposite to said first electric field;
exposing said photoconductive layer to second conditioning radiation, wherein said photoconductive layer comprises a photoconductive material having an absorption edge, said second conditioning radiation including radiation having wavelengths less than a wavelength corresponding to said absorption edge; and
dark-adapting said photoconductive layer.

32. The conditioning method of claim 31, wherein said radiation detector includes a junction layer formed between said first conductive layer and said photoconductive layer, said junction layer being substantially electrically blocking to charge flow from said first conductive layer to said photoconductive layer, and said junction layer being substantially electrically blocking to charge flow from said photoconductive layer to said first conductive layer.

33. The conditioning method of claim 31, wherein said radiation detector is an X-ray detector, said imaging radiation being X-ray imaging radiation.

34. The conditioning method of claim 31, wherein said second conditioning radiation is broad-spectrum radiation.

35. A system for conditioning a radiation detector having a first conductive layer, a photoconductive layer disposed adjacent said first conductive layer, an insulative layer disposed adjacent said photoconductive layer opposite said first conductive layer, and a second conductive layer disposed adjacent said insulative layer opposite said photoconductive layer, said radiation detector forming a latent image in response to both application of an image exposure voltage across said first conductive layer and said second conductive layer and exposure to imaging radiation, and said latent image being read out during application of an image readout voltage across said first conductive layer and said second conductive layer and exposure of said detector to readout radiation, the conditioning system comprising:

means for applying a first conditioning voltage across said first conductive layer and said second conductive layer, said first conditioning voltage having a polarity opposite to a polarity of both said image exposure voltage and said image readout voltage, wherein said first conditioning voltage establishes a first electric field across said photoconductive layer; and means for exposing said photoconductive layer to first conditioning radiation having one or more wavelengths selected to penetrate at least a portion of said photoconductive layer, thereby releasing charge carriers trapped within said photoconductive layer to transport within said first electric field, wherein said photoconductive layer comprises a photoconductive material having an absorption edge, and said first conditioning radiation consists essentially of radiation having wavelengths greater than or equal to a wavelength corresponding to said absorption edge.

36. The conditioning system of claim 35, wherein an absolute value of said first conditioning voltage is a factor of approximately 0.2 to 1.0 times an absolute value of said image readout voltage.

37. The conditioning system of claim 35, wherein an absolute value of said first conditioning voltage is a factor of approximately 0.5 times an absolute value of said image readout voltage.

38. The conditioning system of claim 35, wherein said photoconductive layer comprises amorphous selenium, an absolute value of said image readout voltage is in a range of approximately 1000 to 3000 volts, and an absolute value of said first conditioning voltage is in a range of approximately 200 to 3000 volts.

39. The conditioning system of claim 35, wherein said photoconductive layer comprises amorphous selenium, and said first conditioning radiation consists essentially of radiation having wavelengths greater than or equal to approximately 500 nanometers.

40. The conditioning system of claim 35, wherein said photoconductive layer comprises amorphous selenium, and said first conditioning radiation consists essentially of radiation having wavelengths greater than or equal to approximately 600 nanometers.

41. The conditioning system of claim 35, wherein said photoconductive layer comprises amorphous selenium.

42. The conditioning system of claim 35, wherein said radiation detector includes a junction layer formed between said first conductive layer and said photoconductive layer, said junction layer being substantially electrically blocking to charge flow from said first conductive layer to said photoconductive layer, and said junction layer being substantially electrically blocking to charge flow from said photoconductive layer to said first conductive layer.

43. The conditioning system of claim 35, further comprising:

means for applying, after exposing said photoconductive layer to said first conditioning radiation, a second conditioning voltage across said first conductive layer and said second conductive layer, an absolute value of said second conditioning voltage being less than said first conditioning voltage, wherein said second conditioning voltage establishes a second electric field across said photoconductive layer in a direction opposite to said first electric field; and means for exposing, during application of said second conditioning voltage, said photoconductive layer to second conditioning radiation, said second conditioning radiation including radiation having wavelengths less than a wavelength corresponding to said absorption edge.

44. The conditioning system of claim 35, wherein said radiation detector is an X-ray detector, said imaging radiation being X-ray imaging radiation.

45. The conditioning system of claim 35, wherein said first conditioning radiation consists essentially of radiation passed through a Wrattan 1A filter.

46. The conditioning method of claim 35, wherein said first conditioning radiation consists essentially of radiation having wavelengths in the range of approximately 550 to 900 nanometers.

47. A method for conditioning a radiation detector having a first conductive layer, a photoconductive layer disposed adjacent said first conductive layer, an insulative layer disposed adjacent said photoconductive layer opposite said first conductive layer, and a second conductive layer disposed adjacent said insulative layer opposite said photoconductive layer, said radiation detector forming a latent image in response to both application of an image exposure voltage across said first conductive layer and said second conductive layer and exposure to imaging radiation, and said latent image being read out during application of an image readout voltage across said first conductive layer and said second conductive layer and exposure of said detector to readout radiation, the conditioning method comprising the steps of:

applying a first conditioning voltage across said first conductive layer and said second conductive layer, said first conditioning voltage having a polarity opposite to a polarity of both said image exposure voltage and said image readout voltage, wherein an absolute value of said first Conditioning voltage is a factor of approximately 0.2 to 1.0 times an absolute value of said image readout voltage, and wherein said first conditioning voltage establishes a first electric field across said photoconductive layer; and exposing said photoconductive layer to first conditioning radiation having one or more wavelengths selected to penetrate at least a portion of said photoconductive layer, thereby releasing charge carriers trapped within said photoconductive layer to transport within said first electric field.

48. The conditioning method of claim 47, wherein an absolute value of said first conditioning voltage is a factor of approximately 0.5 times an absolute value of said image readout voltage.

49. The conditioning method of claim 47, wherein said photoconductive layer comprises amorphous selenium, an absolute value of said image readout voltage is in a range of approximately 1000 to 3000 volts, and an absolute value of said first conditioning voltage is in a range of approximately 200 to 3000 volts.

50. A system for conditioning a radiation detector having a first conductive layer, a photoconductive layer disposed adjacent said first conductive layer, an insulative layer disposed adjacent said photoconductive layer opposite said first conductive layer, and a second conductive layer disposed adjacent said insulative layer opposite said photoconductive layer, said radiation detector forming a latent image in response to both application of an image exposure voltage across said first conductive layer and said second conductive layer and exposure to imaging radiation, and said latent image being read out during application of an image readout voltage across said first conductive layer and said second conductive layer and exposure of said detector to readout radiation, the conditioning system comprising:

means for applying a first conditioning voltage across said first conductive layer and said second conductive layer, said first conditioning voltage having a polarity opposite to a polarity of both said image exposure voltage and said image readout voltage, wherein an absolute value of said first conditioning voltage is a factor of approximately 0.2 to 1.0 times an absolute value of said image readout voltage, and wherein said first conditioning voltage establishes a first electric field across said photoconductive layer; and means for exposing said photoconductive layer to first conditioning radiation having one or more wavelengths selected to penetrate at least a portion of said photoconductive layer, thereby releasing charge carriers trapped within said photoconductive layer to transport within said first electric field.

51. The conditioning system of claim 50, wherein an absolute value of said first conditioning voltage is a factor of approximately 0.5 times an absolute value of said image readout voltage.

52. The conditioning system of claim 50, wherein said photoconductive layer comprises amorphous selenium, an absolute value of said image readout voltage is in a range of approximately 1000 to 3000 volts, and an absolute value of said first conditioning voltage is in a range of approximately 200 to 3000 volts.

* * * * *